United States Patent [19]

[11] 3,789,246

Preisig et al.

[45] Jan. 29, 1974

[54] INSULATED DUAL GATE FIELD-EFFECT TRANSISTOR SIGNAL TRANSLATOR HAVING MEANS FOR REDUCING ITS SENSITIVITY TO SUPPLY VOLTAGE VARIATIONS

[75] Inventors: Joseph Otto Preisig, Trenton; Adolph Presser, Kendall Park, both of N.J.

[73] Assignee: RCA Corporation, New York, N.Y.

[22] Filed: Feb. 14, 1972

[21] Appl. No.: 226,227

Related U.S. Application Data

[63] Continuation-in-part of Ser. No. 159,777, July 6, 1971, abandoned.

[52] U.S. Cl. .................................. 307/304, 330/35
[51] Int. Cl. .......................................... H03k 3/26
[58] Field of Search ...... 323/16, 19, 22 R; 307/251, 307/279, 304, 202; 330/35; 331/185

[56] References Cited

UNITED STATES PATENTS

| | | | |
|---|---|---|---|
| 3,480,873 | 11/1969 | Carter | 330/35 |
| 3,436,681 | 4/1969 | Hart | 307/304 |
| 3,581,123 | 5/1971 | Pest | 307/304 |
| 3,525,050 | 8/1970 | Wolf | 330/35 |
| 3,604,952 | 9/1971 | Regitz | 307/304 |
| 3,508,084 | 2/1970 | Warner | 323/16 |
| 3,643,253 | 2/1972 | Blank | 307/304 |
| 3,624,541 | 11/1971 | Lundstrom | 331/185 |
| 3,482,167 | 12/1969 | Kaplan | 307/304 |
| 3,603,811 | 9/1971 | Day | 307/202 |

*Primary Examiner*—John W. Huckert
*Assistant Examiner*—Ro. E. Hart
*Attorney, Agent, or Firm*—Edward J. Norton

[57] ABSTRACT

An oscillator circuit is described using a dual gate MOS-FET transistor. Drift of the oscillating frequency of the oscillator circuit caused by drain supply voltage variations is minimized by suitable bias voltages applied to the two gates. The gate bias voltages are derived from the same principle supply, but the gate voltage variations must be nonlinear with respect to the drain voltage variations to achieve frequency stability. The suitable gate voltages are achieved by means of a voltage divider composed of dual gate MOS-FET transistors.

9 Claims, 13 Drawing Figures

Figures 1, 2, 3:
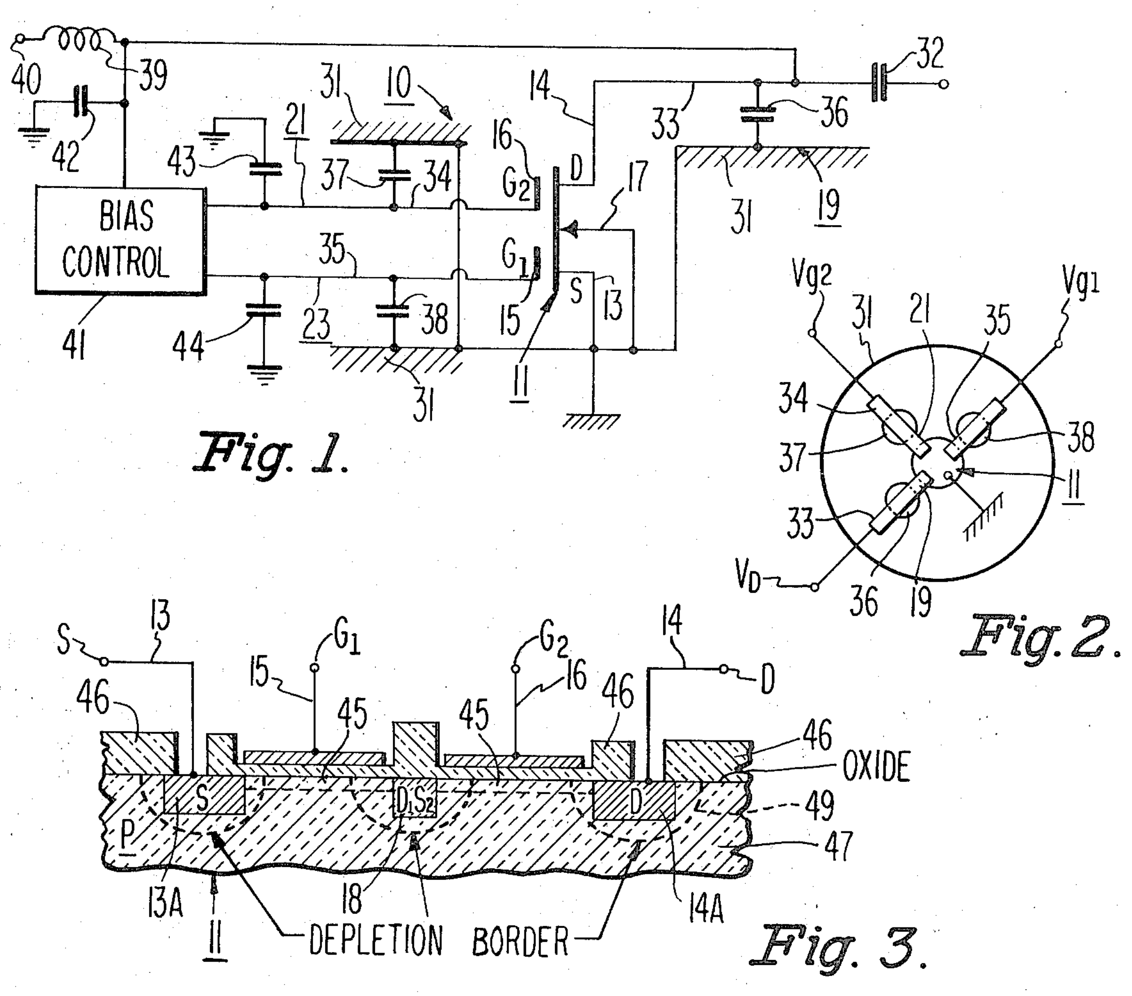

INVENTORS
Joseph O. Preisig and
Adolph Presser
BY Robert L. Troike
ATTORNEY

INVENTORS
Joseph O. Preisig and
Adolph Presser
BY Robert L. Troike
ATTORNEY

INVENTORS
Joseph O. Preisig and
Adolph Presser.
BY Robert L. Troike
ATTORNEY

INSULATED DUAL GATE FIELD-EFFECT TRANSISTOR SIGNAL TRANSLATOR HAVING MEANS FOR REDUCING ITS SENSITIVITY TO SUPPLY VOLTAGE VARIATIONS

This is a continuation-in-part of U. S. application Ser. No. 159,777 filed July 6, 1971 and now abandoned.

The invention herein described was made in the course of or under a contract or subcontract thereunder with the Department of the Army.

This invention relates to metal-insulator-semiconductor (MIS) gate field effect transistors (FET) having two or more gate electrodes in addition to the source and drain electrodes and more particularly to a bias control circuit for such dual gate MIS-FET transistors.

Metal-insulator-semiconductor gate field effect transistors, as the name implies, are field effect transistors having a gate electrode which is insulated from the source and drain electrodes. One type where an oxide layer provides this insulation is termed MOS. These transistors have attractive characteristics which appear to be promising for many circuit applications. Some of these characteristics are: (1) high input impedance, (2) low cross modulation, (3) bilateral conduction, (4) low noise, (5) simplified direct coupling capability and (6) compatibility with integrated circuit techniques.

While these devices find wide use at lower frequencies, these devices could find wide use in devices at the higher frequency, for example, microwave frequencies. When attempting to use a dual gate MIS-FET transistor in an oscillator circuit, for example, at microwave frequencies, the variations in drain supply voltage can produce substantial variations in the frequency of the output of the oscillator.

Briefly, there is provided an insulated gate field effect transistor having a source electrode, a drain electrode and at least one gate electrode formed on a substrate of semiconductive material. The gate electrode is insulated from the substrate, the drain electrode, and the source electrode. The electrodes of the transistor are biased so that the transistor operates as a signal translating device, for example, an oscillator. The biasing circuit includes a power supply coupled across the source and the drain electrode. Changes in the output voltage of the power supply can cause changes in the operating characteristics of the signal translating device. The biasing circuit further includes a control circuit coupled between one of the gate electrodes and the power supply. The control circuit in response to variations in the output of the power supply provides at the coupled one of the gate electrodes a bias voltage that changes in a manner relative to changes in the power supply to reduce the sensitivity of the signal translating device to variations in the output of the power supply.

Figures 4, 5, 6:
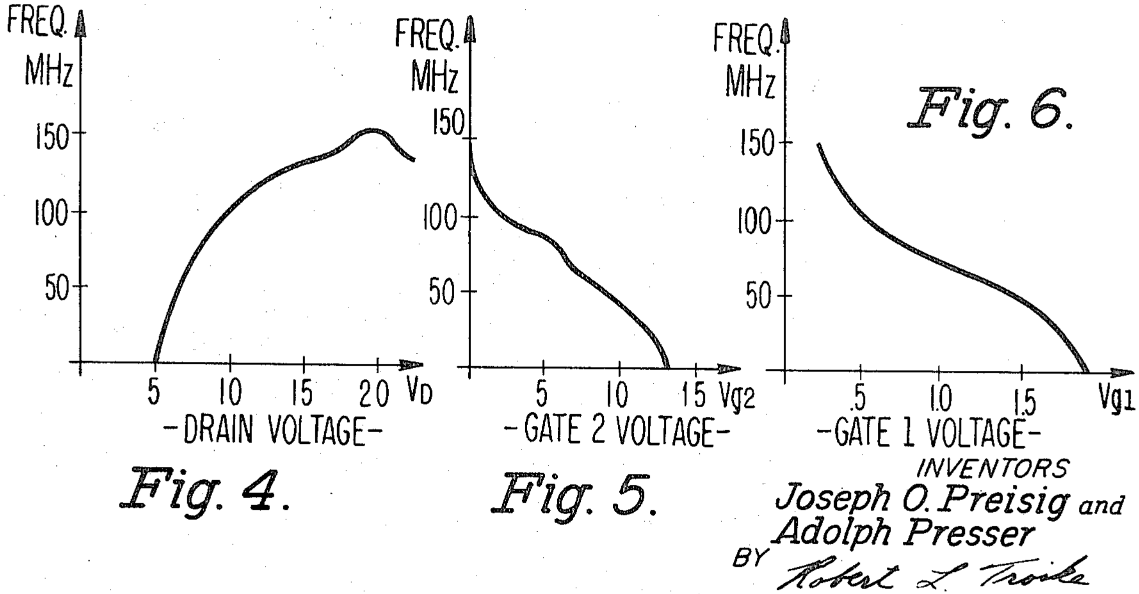
Figure 7:
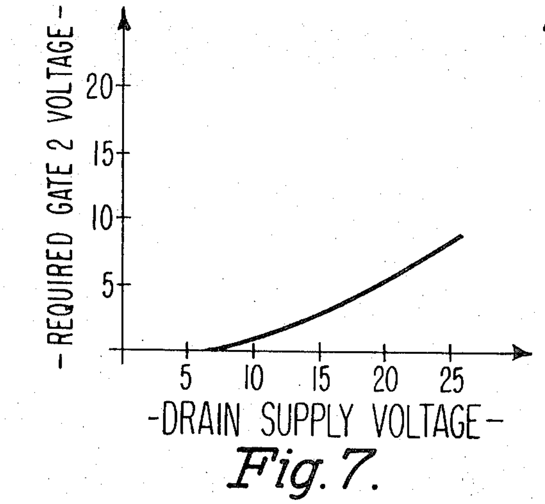
Figure 9:
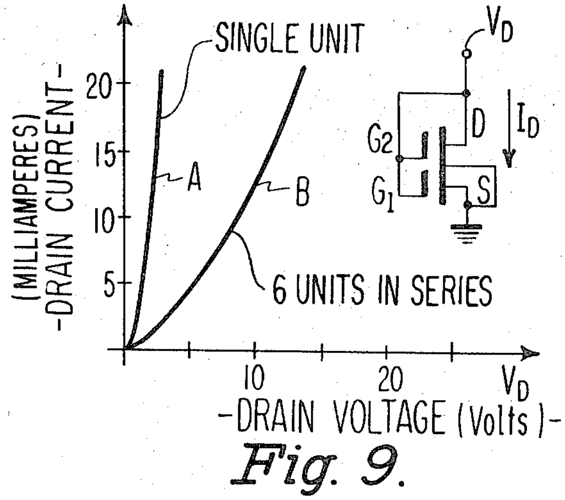
Figure 11:
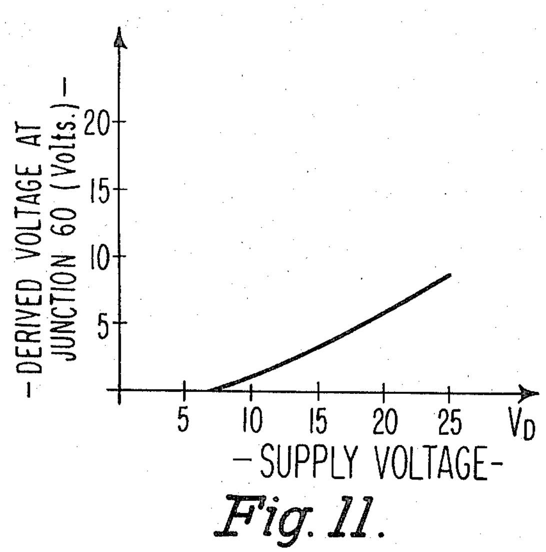
Figure 8:
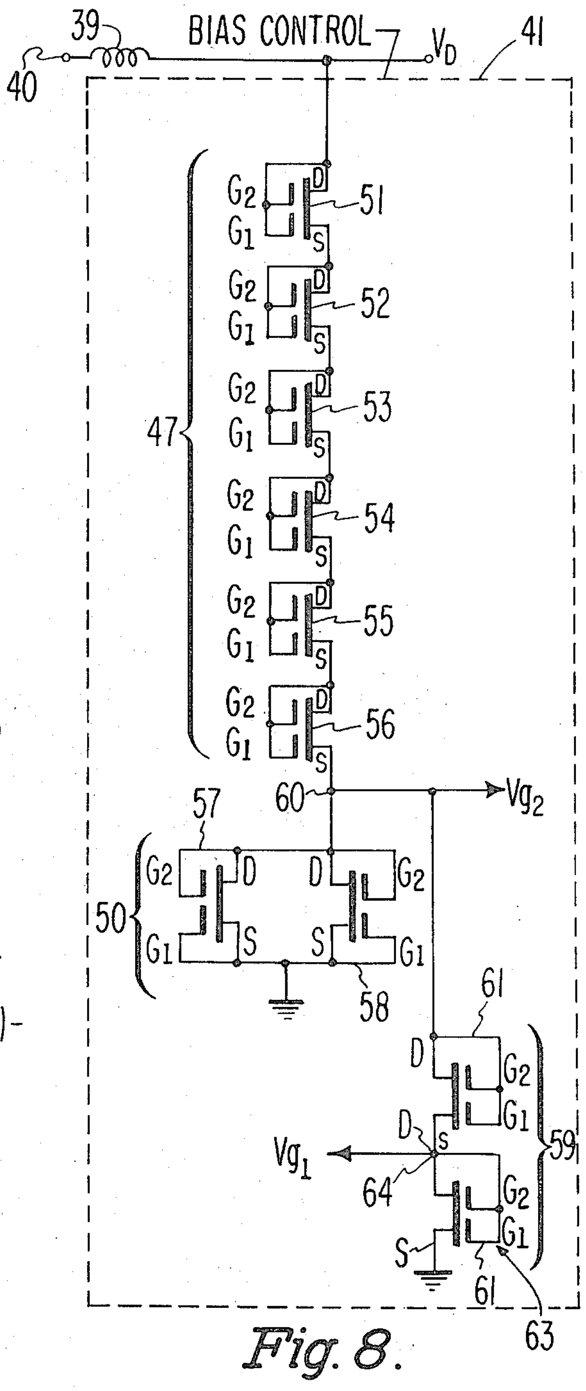
Figure 12:
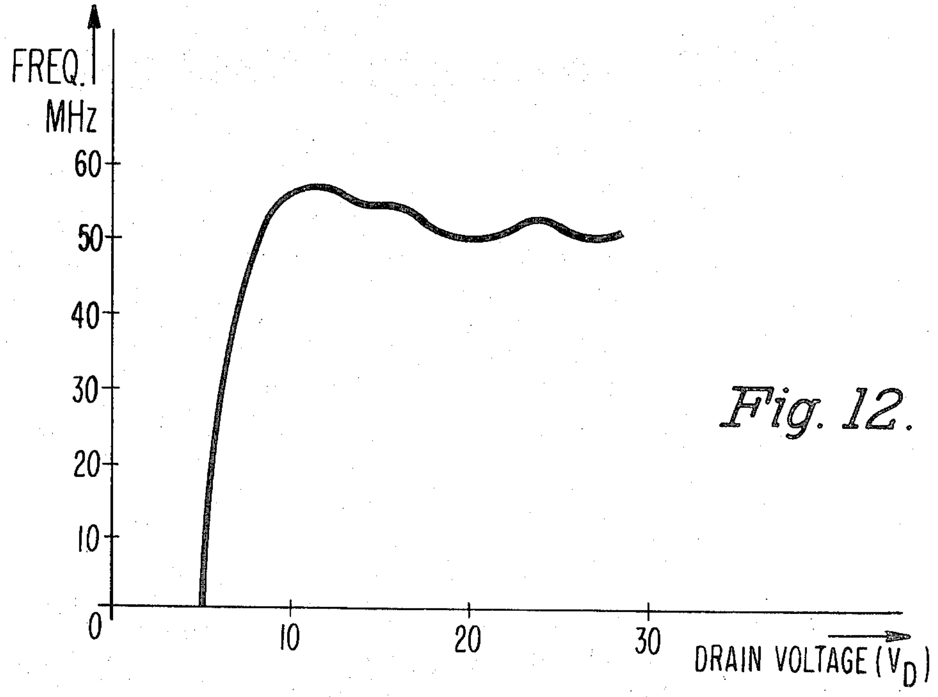
Figures 10, 13:
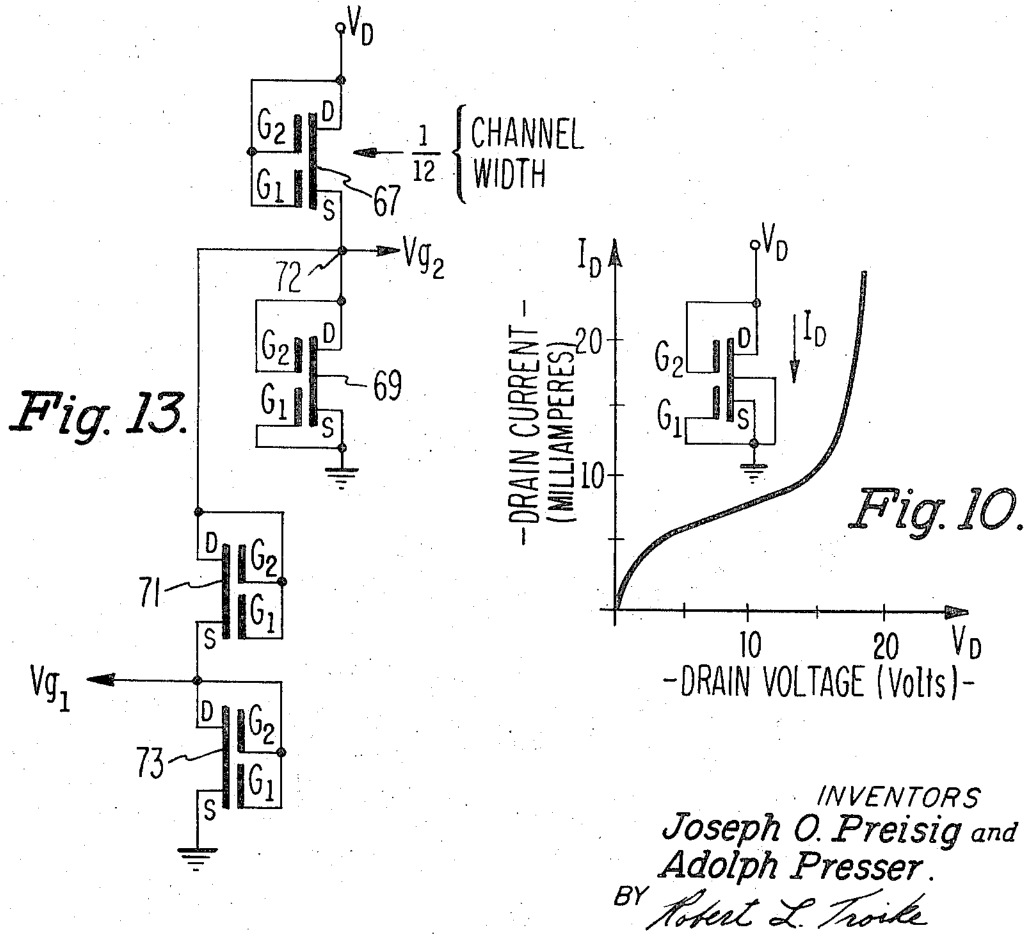

The invention itself can best be understood from reference to the accompanying drawings in which:

FIG. 1 is a schematic diagram of an oscillator circuit using a dual gate MOS-FET transistor and three strip transmission lines, FIG. 2 illustrates the mechanical structure of the oscillator of FIG. 1, FIG. 3 is a cross sectional view of a partial dual gate MOS-FET semiconductor transistor structure as used in the oscillator of FIG. 1, FIG. 4 is a plot of the change (Δf) in frequency output from the oscillator with drain (D) supply voltage variation keeping the $G_1$ and $G_2$ gate bias voltages constant, FIG. 5 is a plot of the change (Δf) in frequency output of the oscillator with variation in the $G_2$ gate electrode voltage keeping drain (D) and $G_1$ gate bias voltages constant, FIG. 6 is a plot of the change (Δf) in frequency output of the oscillator with variation in the $G_1$ gate electrode voltage keeping the drain (D) and $G_2$ gate bias voltages constant, FIG. 7 is a plot of the required $G_2$ gate bias voltage for constant oscillation frequency versus a varying drain (D) supply voltage where $G_1$ gate bias voltage is constant, FIG. 8 shows a voltage divider circuit using dual gate MOS-FET transistors, FIG. 9 is a plot of the drain current-voltage curve for a dual gate MOS-FET transistor with both gate electrodes ($G_1$, $G_2$) connected to the drain electrode, FIG. 10 is a plot of the drain current-voltage curve for a dual gate MOS-FET transistor with the $G_1$ gate electrode connected to the source electrode (S) and the $G_2$ gate electrode connected to the drain (D), FIG. 11 shows the available $G_2$ gate bias voltage ($Vg_2$) with drain (D) supply voltage variation using a voltage divider composed of MOS-FET transistor devices according to FIG. 8, FIG. 12 is a plot of the change (Δf) in frequency versus drain supply voltage for the oscillator circuit of FIG. 1 with the voltage divider bias control of FIG. 8, and FIG. 13 illustrates another form of a voltage divider circuit, Referring now to FIG. 1, an oscillator circuit 10 includes a dual gate MOS-FET transistor 11. The transistor 11 includes a source electrode 13 or S, a drain electrode 14 or D and a pair of gate electrodes 15 and 16. Gate electrodes 15 and 16 are herein referred to as $G_1$ and $G_2$ gate electrodes, respectively. The source electrode 13 (S) is connected to ground or a point of reference potential. The substrate of the MOS-FET transistor 11 is connected by a lead 17 to the reference or ground potential to improve stability of the transistor device at higher frequencies. The oscillator circuit further includes three microstrip transmission lines 19, 21 and 23.

Referring to FIG. 2 along with FIG. 1, there is illustrated the mechanical structure of the oscillator of FIG. 1. The ground planar conductor for the microstrip transmission lines 19, 21 and 23 is provided by grounded disk 31. Narrow strip-like conductors 33, 34 and 35 are spaced from the ground conductor 31 by slidable capacitors 36, 37 and 38, respectively, to form the respective transmission lines 19, 21 and 23. One end of narrow strip-like conductor 33 is connected to the drain electrode 14 of the dual gate MOS-FET transistor 11. One end of the narrow strip-like conductor 34 of transmission line 21 is connected to the $G_2$ gate electrode 16 of the MOS-FET transistor 11. One end of the narrow strip-like conductor 35 of transmission line 23 is connected to $G_1$ gate electrode 15. The electrical length of the microstrip transmission lines 19, 21 and 23 is determined by the position of the slidable bypass capacitors 36, 37 and 38 coupled between the narrow strip-like conductors 33, 34 and 35 and the wider ground plate or disk 31. The space or gap between the respective narrow strip-like conductors and the plate or disk 31 is air except for that part taken up by the slidable bypass capacitors 36, 37 and 38.

A direct current (d.c.) bias potential is applied across the source 13 and drain 14 by one terminal of the potential source,not shown, being coupled at terminal 40 to the drain 14 through inductor 39 and the other terminal thereof being coupled to ground. The potential source may be provided by a battery. RF bypass of the potential source is provided by capacitor 42 connected between the low voltage end of inductor 39 and ground or reference potential. The gate bias supply voltages $Vg_2$ and $Vg_1$ for gates 16 and 15 respectively are obtained at the bias control 41 which is coupled at one end through inductor 39 to the potential source at terminal 40 and at the other end to the gates 15 and 16 of the transistor 11. The RF current at the gates 15 and 16 is bypassed from the bias control 41 by the capacitors 43 and 44.

Referring to FIGS. 1 and 2, the oscillator circuit 10 is of the reactive feedback type. The feedback is achieved by the internal drain 14 to gate 16 capacitance and the internal drain 14 to gate 15 capacitance in combination with the external microstrip line inductances provided by transmission lines 19, 21 and 23. The microstrip transmission lines which are acting as inductances can be replaced by sections of wire to provide lumped inductances. Resonance occurs between the inductances provided by conductors 33, 34 and 35 and the transistor interelectrode capacitances. These transistor interelectrode capacitances are developed at the depletion regions and the associated gates 15 and 16. Capacitances 36, 37 and 38 are additional bypass capacitors which determine the electrical length of the inductances formed by conductors 33, 34 and 35.

Referring to FIG. 3, there is illustrated in sketch form a cross section of the dual gate MOS-FET transistor 11. The dual gate MOS field effect transistor structure has a source region 13A (S), a drain region 14A (D), gate electrodes 15 ($G_1$) and 16 ($G_2$) and an intermediate source-drain ($D_1S_2$) region 18 in the structure which operates as a drain region ($D_1$) with respect to the source region 13A and a source region ($S_2$) with respect to drain region 14A (D). A conducting channel or layer 45 is formed with layer 46 being the insulating oxide layer. The substrate is shown as 47. The conducting channel 45 is generally formed by the application of a suitable bias field to gates 15 ($G_1$) and 16 ($G_2$). The substrate 47 may be, for example, of P-type material with the other regions of the transistor 11 determined in a manner understood in the art.

The conditions for oscillation namely, gain times (x) feedback = 1 and phase inversion between drain (D) and gate ($G_1$,$G_2$) are fulfilled by the proper tuning of the inductances provided by the microstrip transmission lines 19, 21 and 23 so that the voltage at gate 15 ($Vg_1$) is 180° out of phase with the voltage at that drain (D1) associated with the intermediate source-drain diffusion region 18, and the voltage at gate 16 ($Vg_2$) is 180° out of phase with the voltage at drain 14 (D). The phase reversal between the voltage at the gate 15 and the drain (D1) associated with the intermediate region 18 is due to the voltage division between the inductance associated with transmission line 23 and the drain (D1) to gate 15 capacitance. The voltage at gate 16 is 180° out of phase with respect to the voltage at drain 14 (D) due to the voltage division between the inductance provided by transmission line 21 and the drain 14 (D) to gate 16 capacitance. The transistor 11 is biased to provide sufficient gain to sustain oscillations at 2GHz. OUtput coupling of generated signals in the oscillator may be provided through capacitor 32.

Upon an increase in the drain voltage ($V_D$) at electrode 14 keeping the gate 15 and 16 voltages constant ($Vg_1$ and $Vg_2$ constant), the frequency increases above 2GHz as illustrated in the plot of FIG. 4. It has been found, as illustrated in the plot of FIG. 5, that by holding the drain 14 ($V_D$) and gate 15 ($G_1$) supply voltages constant, increasing the gate 16 ($G_2$) voltage ($Vg_2$) decreases the frequency. The plot of FIG. 6 shows the frequency variation of the oscillator, with varying gate 15 ($G_1$) voltage ($Vg_1$), keeping the drain 14 voltage ($V_D$) and gate 16 ($G_2$) voltage ($Vg_2$) constant. As shown therein, the frequency decreases with increasing voltage ($Vg_1$) at the gate 15 ($G_1$). In accordance with the teaching herein, frequency independence of supply voltage variations can be achieved by deriving drain 14 (D) and either or both gate bias voltages $Vg_2$ and $Vg_1$ from the same supply source and further by influencing these gate bias voltages $Vg_1$ and the drain bias voltage that will achieve frequency stability.

An explanation as to why frequency stabilization is obtainable can be held by remembering that the gate 16 ($G_2$) is associated internally with a source to drain diffusion region 18 ($D_1S_2$) without external connection as illustrated in FIG. 3. The area of diffusion of region 18 ($D_1S_2$) varies with potential changes at gate 16 ($G_2$). Its depletion capacitance varies similar to drain 14 (D) depletion capacitance. These two capacitances decrease with increasing voltage and their depletion areas approach each other. However, gate 16 ($G_2$) voltage also affects the approaching depletion fronts and having at gate 16 a voltage similar in polarity and potential as on the drain 14 retards the spread of depletion fronts resulting in a rather constant total capacitance. A similar situation exists for gate 15 ($G_1$). A further explanation is that an increase in the gate voltage ($Vg_2$ or $Vg_1$) gives a larger channel charge and consequently an increase in the gate capacitance associated with this charge. The drain to channel capacitance is increased by this charge and this reduces the frequency of oscillation. Still, a further explanation is that the feedback capacitance between the drain 14 and the gate 16 ($G_2$) generally increases with the increased drain 14 current associated with the addition of voltage bias on the gates. This charge reduces the feedback phase shift between the drain 14 and the gate 16. To maintain the correct phase, the oscillator frequency has to reduce.

Referring to FIG. 7, there is shown the required gate 16 ($G_2$ voltage $Vg_2$) for constant oscillation frequency where the drain supply voltage $V_D$ and the voltage at gate 15 $Vg_1$ are proportional to supply voltage at terminal 40. As can be seen referring to FIG. 7, a nonlinear relationship exists between the drain supply voltage $V_D$ and that supply voltage required at gate 16 to achieve frequency stabilization. Achievement of this required nonlinear gate 16 ($G_2$) bias voltage $Vg_2$ can be obtained automatically using the same power supply source by using for the bias control 41 a voltage divider arrangement as illustrated in FIG. 8.

The voltage divider arrangement of FIG. 8 uses dual gate MOS-FET transistors between the potential source and a point of reference potential. The gate 16 ($G_2$) voltage $Vg_2$ is derived at the terminal 60 between the resistive half 47 made up of six identical MOS-FET dual gate transistors 51 through 56 connected in series and resistive half 50 made up of two parallel connected dual gate MOS-FET transistors 57 and 58.

The six serially connected MOS-FET transistors providing resistive half 47 are all identical devices with both of the gate terminals $G_1$ and $G_2$ of these dual gate MOS-FET transistors 51 through 56 connected to the drain (D). Referring to FIG. 9, there is illustrated the drain current-voltage curve for this type of dual gate MOS-FET device where both gates ($G_1$, $G_2$) are connected to the drain (D). Plot A of FIG. 9 illustrates the current-voltage relationship of a single MOS-FET device, and plot B shows the current-voltage curve for six such devices as used in nonlinear resistive half 47 of the voltage divider arrangement of FIG. 8.

The resistive half 50 is made up of two MOS-FET transistors 57 and 58, with gate $G_2$ electrode of each MOS-FET transistor connected to the drain electrode D of that associated device and the other gate $G_1$ electrode connected to the source (S). The source s and the gate $G_1$ are connected to reference potential or ground. Referring to FIG. 10, there is illustrated the drain current-voltage curve for a single dual gate MOS-FET device where the gate $G_2$ electrode is connected to the drain D electrode and the other gate $G_1$ electrode is connected to the source S electrode.

At the junction 60 of the resistive half 47 and resistive half 50 is provided a resultant voltage $Vg_2$ which approximates the required nonlinear variation in gate 16 supply voltage relative to drain supply voltage as illustrated in FIG. 7. A somewhat finer adjustment of the desired bias supply voltage is had as shown in FIG. 8 by coupling a subvoltage divider 59 between the junction 60 of the divider halves 47 and 50 and the point of reference potential. This divider 59 is made up of two series connected dual gate MOS-FET devices 61 and 63 with the devices being of the type where both gate electrodes ($G_1$ and $G_2$) are connected to the drain (D) electrode. At the junction 64 of the divider devices 61 and 63 is developed the voltage $Vg_1$, and this is coupled to the gate 15 ($G_1$) electrode of the oscillator of FIG. 1.

FIG. 11 shows the available $Vg_2$ voltage from the voltage divider arrangement shown in FIG. 8 with the supply voltage variation ($V_D$). As can be seen, this nonlinear relationship is similar to that of FIG. 7 which is required to provide a constant frequency of operation despite supply voltage variations. FIG. 12 shows the resulting minimal frequency drift when the voltage divider network of FIG. 8 is used for the bias control 41 of the oscillator circuit of FIG. 1. With voltage changes from 10 to 30 volts, only negligible differences in frequency occur at 2GHz plus (+) about 55MHz.

Referring to FIG. 13, there is illustrated an alternate approach to the divider circuit. In this alternate approach arrangement a single dual gate MOS-FET transistor 67 and a second single dual gate MOS-FET transistor 69 are coupled at junction 72 and are coupled in series across the power supply. The dual gate MOS-FET transistor 67 has both gate electrodes ($G_1$,$G_2$) connected to the drain electrode and the dual gate MOS-FET transistor 69 has one gate electrode ($G_1$) connected to the source electrode (S) and the other gate electrode ($G_2$) connected to the drain electrode (D). The channel width of the dual gate MOS-FET transistor 67 is 1/12th the channel width of dual gate MOS-FET transistor 69.

As discussed previously in connection with FIG. 3, the depth of the channel region 45 is determined by the bias voltage at the gate electrodes. The width of the channel region is determined by the width of that surface area of the gate electrode in contact with the insulating oxide layer of a MOS structure. Therefore, the channel width can be increased or decreased by increasing or decreasing the width of that surface area of the gate electrode in contact with the insulating oxide layer.

Between the junction 72 and the power supply return terminal is a second voltage divider made up of two series connected dual gate MOS-FET transistors 71 and 73. Each of these transistors 71 and 73 have both of their gate electrodes connected to the drain electrode and have a channel width equal to each other and equal to that of transistor 69.

At the junction 72 of the voltage divider of FIG. 13, there is developed a voltage $Vg_2$ that can substantially offset that variation in the output of a d.c. power supply when this junction is coupled to gate 16 of FIG. 1. Additional voltage to offset power supply variations can be provided by connecting the junction of transistors 71 and 73 to gate 15 of FIG. 1.

The nonlinear gate bias voltage variation described, in addition to compensating for frequency drift with supply voltage change in MOS-FET type oscillators, can also provide optimum noise, gain and cross modulation or intermodulation performance of these dual gate MOS-FET devices when using them as amplifiers and mixers and for automatic gain control. Since the oscillator devices and divider units provided herein are all dual gate MOS-FET devices of similar composition and construction, all of the circuitry described can be easily fabricated on the same chip. Therefore the circuitry is well suited for low cost monolithic integration.

We claim:

1. In a circuit of the type including a plural gate, field effect transistor having a source electrode, a drain electrode and at least two gate electrodes formed on a substrate of semiconductor material with the gate electrodes insulated from said substrate and from the drain and source electrodes, means for connecting a power supply the output of which may vary between said source and drain electrodes for biasing said transistor, the operating characteristics of said circuit changing with said power supply output variations, the improvement comprising:

a bias control means including a voltage divider circuit having a first portion and a second portion joined to each other, said first portion containing at least one field effect transistor having source, drain and gate electrodes and characterized by only the gate and drain electrodes connected to each other, said second portion containing at least one insulated gate field effect transistor having source, drain and gate electrodes and characterized by at least one of its gate electrodes connected to its source electrode, and means connecting one of said gate electrodes of said plural gate, field effect transistor to the junction of said portions and for connecting said power supply connecting means to a point near one end of said voltage divider circuit, said bias control means responsive to said power supply output variations for providing at said one gate electrode of said plural gate, field effect transistor a bias which substantially offsets the effect of said power supply output variations in a manner to minimize said changes in said operating characteristics.

2. The circuit claimed in claim 1 wherein said first portion includes at least one voltage dividing dual insulated gate field effect transistor having both of its gate electrodes connected to its drain electrode and said second portion includes at least one voltage dividing dual insulated gate field effect transistor having one of its gate electrodes connected to its source electrode and the other of its gate electrodes connected to its drain electrode.

3. The circuit claimed in claim 2 wherein said first portion is made up of six serially connected identical dual gate, field effect transistors each having both gate electrodes connected to its drain electrode and said second portion is made up of two parallel connected dual insulated gate, field effect transistors each having a first of its gate electrodes connected to its source electrode and the second of its gate electrodes connected to its drain electrode.

4. The circuit claimed in claim 2 wherein said bias control means further includes a second voltage divider coupled between the junction of said first and second portions and said source electrode of said first-mentioned dual gate field effect transistor, said second divider including at least two series connected dual gate field effect transistors the junction of which is coupled to the other of said gate electrodes of said plural gate, field effect transistor.

5. The invention claimed in claim 4 wherein said second divider is made up of two dual gate field effect transistors with both gate electrodes of each transistor connected to the drain electrode thereof.

6. The circuit claimed in claim 2 wherein said second portion is made up of a single dual gate field effect transistor having a given channel width and having one of its gate electrodes connected to its source electrode and the other of its gate electrodes connected to its drain electrode and wherein said first portion is made up of a single dual gate field effect transistor having a channel width 1/12th said given channel width and having both of its gate electrodes connected to its drain electrode.

7. A voltage divider for developing a voltage which can be used to offset variations in the output of a direct current power supply, comprising:

a first portion including at least one dual gate field effect transistor having its two gate electrodes connected to the drain electrode thereof, a second portion including at least one dual gate field effect transistor having one gate electrode connected to the drain electrode and the other gate electrode connected to the source electrode thereof, means for connecting said first and second portions in series between the terminals of said power supply, the operating characteristics of said first and second transistors being determined to cause a voltage to appear at the junction of said portions reflecting said variations in a compensating manner.

8. A voltage divider as claimed in claim 7 means connecting the drain of said first-mentioned transistor to one terminal of said power supply and the source of said second-mentioned transistor to a return terminal of said power supply, and means to connect the source of said first-mentioned transistor to the drain of said second-mentioned transistor at said junction.

9. A voltage divider as claimed in claim 8, said first portion including a plurality of similar dual gate field effect transistors series connected drain-to-source with the drain of the transistor at one end of said series connected to said one power supply terminal and the source of the transistor at the other end of the said series connected to said junction, said second portion including a plurality of dual gate field effect transistors parallel connected drain-to-drain and source-to-source will all the drains of said parallel transistors connected to said junction and all the sources of said parallel transistors connected to said power supply return terminal.

* * * * *